US006848160B1

(12) United States Patent
Cota, Jr.

(10) Patent No.: US 6,848,160 B1
(45) Date of Patent: Feb. 1, 2005

(54) METHOD OF FORMING A PRODUCT IN A MOVING WEB

(75) Inventor: Donald E. Cota, Jr., St. Johnsbury, VT (US)

(73) Assignee: Thermal Shield Solutions, LLC, St. Johnsbury, VT (US)

(*) Notice: Subject to any disclaimer, the term of this patent is extended or adjusted under 35 U.S.C. 154(b) by 46 days.

(21) Appl. No.: 10/012,658

(22) Filed: Oct. 30, 2001

Related U.S. Application Data
(60) Provisional application No. 60/244,473, filed on Oct. 31, 2000.

(51) Int. Cl.[7] ................................................ B23P 17/00
(52) U.S. Cl. ........................... 29/414; 29/513; 29/437; 428/68; 493/76
(58) Field of Search .................... 29/437, 438, 439, 29/445, 505, 509, 428, 513, 514, 414, 412; 428/68, 71, 72, 75; 72/336, 339, 404, 405.06; 493/56, 75, 76, 79; 53/488, 486

(56) References Cited

U.S. PATENT DOCUMENTS

| | | | | |
|---|---|---|---|---|
| 583,683 A | * | 6/1897 | Gersant et al. .............. 228/137 |
| 2,576,698 A | | 11/1951 | Russum ........................ 154/28 |
| 2,815,568 A | * | 12/1957 | Bianca et al. ................. 29/505 |
| 2,867,035 A | | 1/1959 | Patterson ..................... 29/455 |
| 3,031,358 A | | 4/1962 | Rutter et al. .................. 154/44 |
| 3,344,503 A | | 10/1967 | Merritt ........................ 29/430 |
| 3,383,256 A | * | 5/1968 | Carbone ....................... 156/69 |
| 3,521,422 A | * | 7/1970 | Tabor ........................... 53/420 |
| 3,540,116 A | * | 11/1970 | Drahos et al. ................. 29/430 |
| 3,553,822 A | | 1/1971 | Bergh et al. ................... 29/445 |
| 3,972,155 A | * | 8/1976 | Mahaffy et al. ............... 53/453 |
| 4,096,729 A | | 6/1978 | Dupler ......................... 72/350 |
| 4,131,980 A | * | 1/1979 | Zinnbauer .................... 29/463 |
| 4,183,557 A | * | 1/1980 | Hinden ......................... 285/53 |
| 4,759,165 A | * | 7/1988 | Getoor et al. ................. 52/528 |
| 4,811,550 A | * | 3/1989 | Hautemont ................... 53/478 |
| 4,900,328 A | | 2/1990 | Breda et al. ........... 29/890.039 |
| 5,080,949 A | | 1/1992 | Nawrocki et al. ............. 428/75 |
| 5,196,253 A | | 3/1993 | Mueller et al. .............. 428/138 |
| 5,259,166 A | * | 11/1993 | Carey et al. .............. 52/749.12 |
| 5,309,622 A | | 5/1994 | Pirchl ......................... 29/566.1 |
| 5,494,319 A | * | 2/1996 | Thomas ........................ 285/55 |
| 5,700,542 A | * | 12/1997 | Pirchl ........................... 428/68 |
| 5,953,808 A | | 9/1999 | Schenck, Jr. et al. ......... 29/509 |
| 6,231,944 B1 | * | 5/2001 | Holt ............................. 428/57 |
| 6,322,866 B1 | * | 11/2001 | Sloot ......................... 428/40.1 |

\* cited by examiner

*Primary Examiner*—David P. Bryant
*Assistant Examiner*—Stephen Kenny
(74) *Attorney, Agent, or Firm*—Downs Rachlin Martin PLLC

(57) ABSTRACT

A manufacturing process (100) for forming a product, such as a thermal shield (20), in a web (102) of material. The thermal shield includes a first plate (22) and a second plate (24) joined to one another at a seam (28). The manufacturing process includes engaging an upper member (128) containing second plate with the web, which contains the first plate. Registration structures (112, 130) are provided to the upper member and web for keeping the upper member in proper registration with the web during formation of the seam. After the seam has been at least partially formed, the thermal shield is separated from the web.

17 Claims, 5 Drawing Sheets

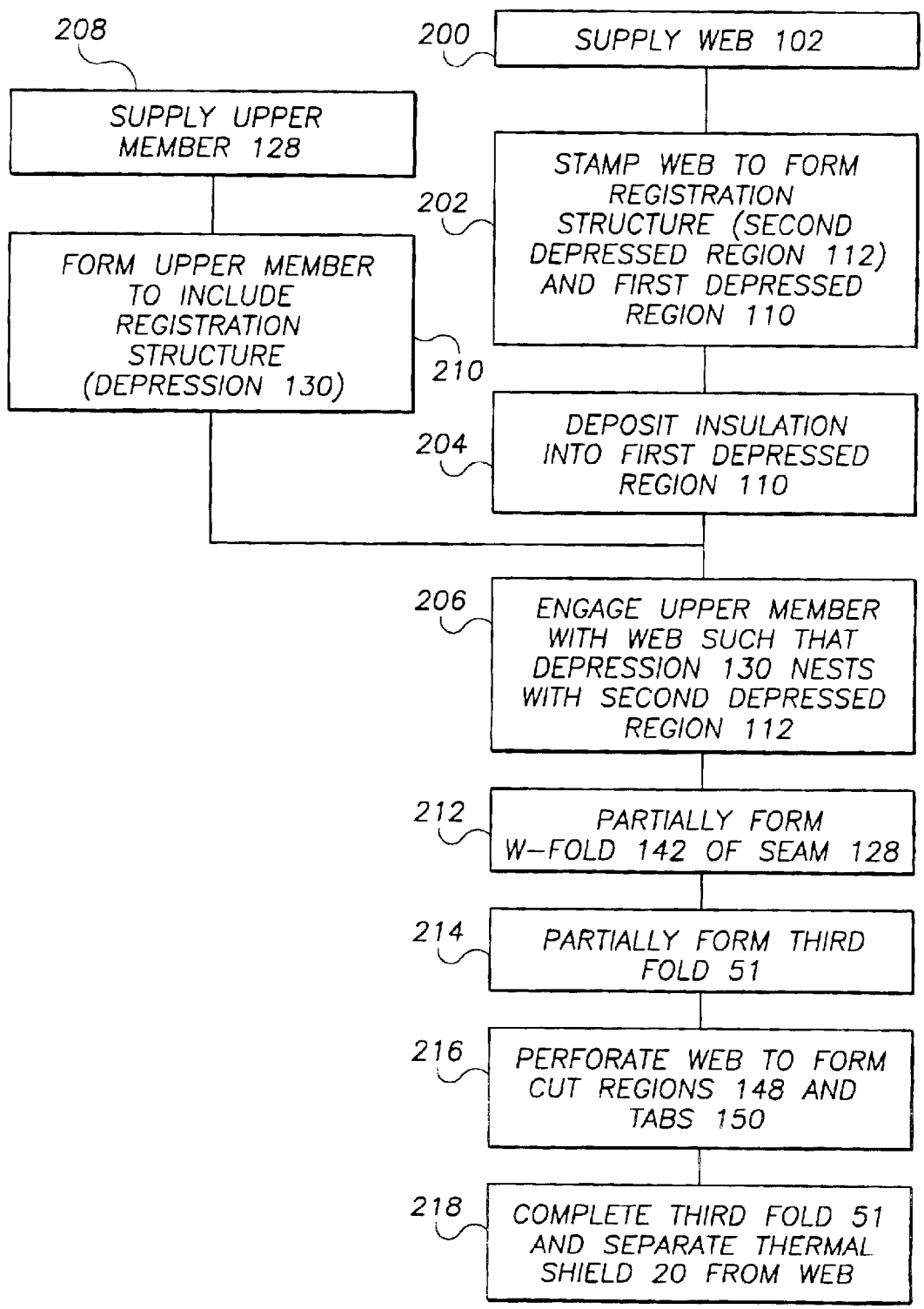

METHOD OF FORMING A PRODUCT IN A MOVING WEB

CROSS-REFERENCE TO RELATED APPLICATIONS

This application claims priority on U.S. Provisional Application Ser. No. 60/244,473, filed Oct. 31, 2000 and entitled, "Method Of Forming A Product In A Moving Web Of Material."

FIELD OF THE INVENTION

The present invention relates generally to the field of product manufacturing. More particularly, the present invention is directed to a method of forming a product in a moving web.

BACKGROUND OF THE INVENTION

During the manufacture of a product that includes two or more components that must be joined to one another to form the final product, difficulties often arise in maintaining the separate components in proper registration with one another until they are joined. An example of a product having separate components joined to one another is a thermal shield of the type used in connection with vehicles and other apparatus, e.g., electrical generators and air compressors, among others, powered by internal combustion engines. This type of thermal shield typically comprises an insulating material, such as fiberglass batting or air, encapsulated between first and second metal plates that are joined to one another by a seam extending around the periphery of the thermal shield.

Thermal shields are conventionally manufactured by die cutting the first and second plates to the desired shape of the finished thermal shield and then stamping at least one of the plates to form a pan having a cavity that receives the insulation. The insulation is then inserted into the cavity, and the first and second plates are joined to one another, typically using a folded or rolled seam at the peripheral edges of the plates. Prior to forming the seam, the first and second plates are brought into registration with one another. Often, however, proper registration is difficult to effect and/or maintain due to the speed of the manufacturing process used to make the thermal shield or is destroyed during the folding or rolling of the seam. Results of misregistration of the first and second plates range from acceptable, but unsightly, seams to severely malformed seams that require the manufacturer to scrap the affected thermal shields.

SUMMARY OF THE INVENTION

In one aspect, the present invention is directed to a method of forming a product. The method comprises the steps of providing a web and positioning a member proximate the web. At least one registration structure is provided that limits at least horizontal translation between the member and the web. Subsequent to providing the at least one registration structure, the member is joined to a portion of the web. The member and the portion of the web are then separated from the web.

In another aspect, the present invention is directed to a method of forming a plurality of products in a web. The method comprises the steps of providing a web having a longitudinal axis and providing the web with a plurality of first registration structures spaced from one another along said longitudinal axis. A plurality of members are provided each having a second registration structure adapted for inter-engaging a corresponding one of the first registration structures to substantially prevent horizontal translation of the corresponding one of the plurality of members relative to the web. Each of the second registration structures is engaged with a corresponding one of the first registration structures. Each of the members is joined with the web so as to at least partially form each of the plurality of products. At least one of the plurality of products is separated from the web while the web contains at least one other of the plurality of products.

In a further aspect, the present invention is directed to structure comprising a web having longitudinal edges and a surface extending between said longitudinal edges. At least one member engages the surface. At least one seam is formed in the web. The at least one seam is spaced inwardly from the longitudinal edges and secures the at least one member to the web.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIG. 6 is a flow diagram for the manufacturing process of FIG. 4.

DETAILED DESCRIPTION OF THE DRAWINGS

Figure 3:
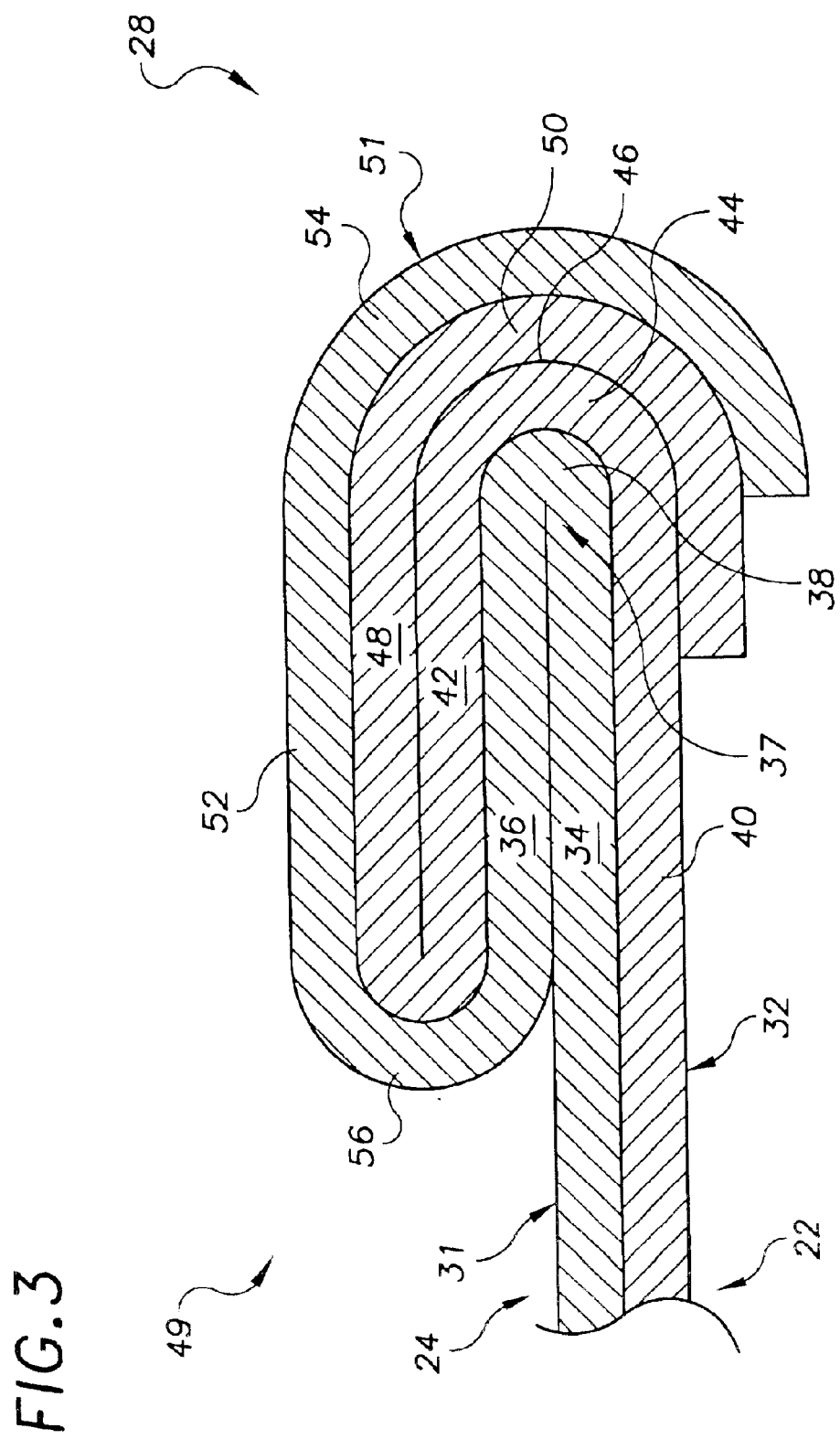
FIG. 3 is an enlarged partial cross-sectional view of the thermal shield as taken along line 3—3 of FIG. 1, showing the seam.
Figure 4:
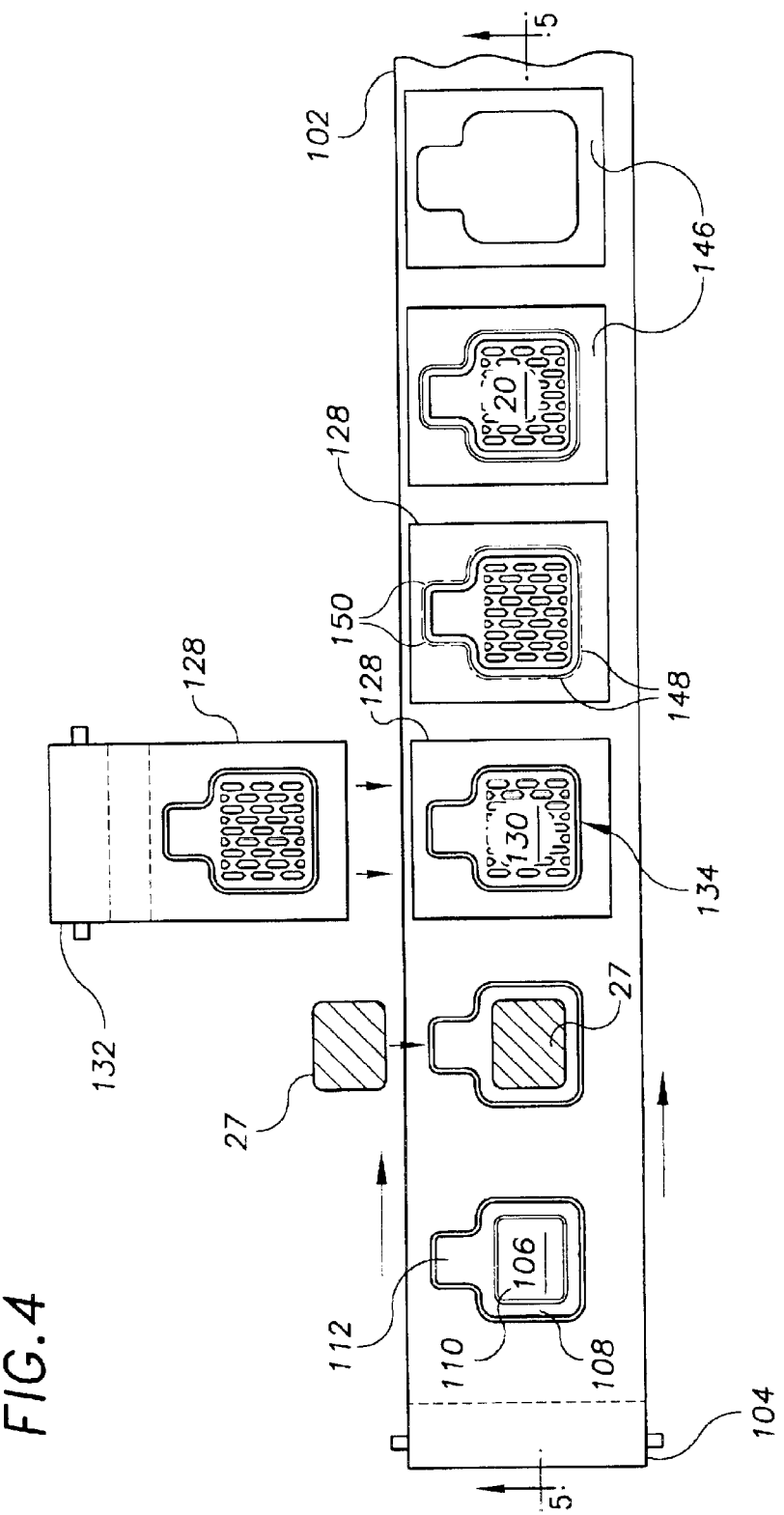
FIG. 4 is a schematic top view of a thermal shield manufacturing process according to the present invention.
Figure 5:
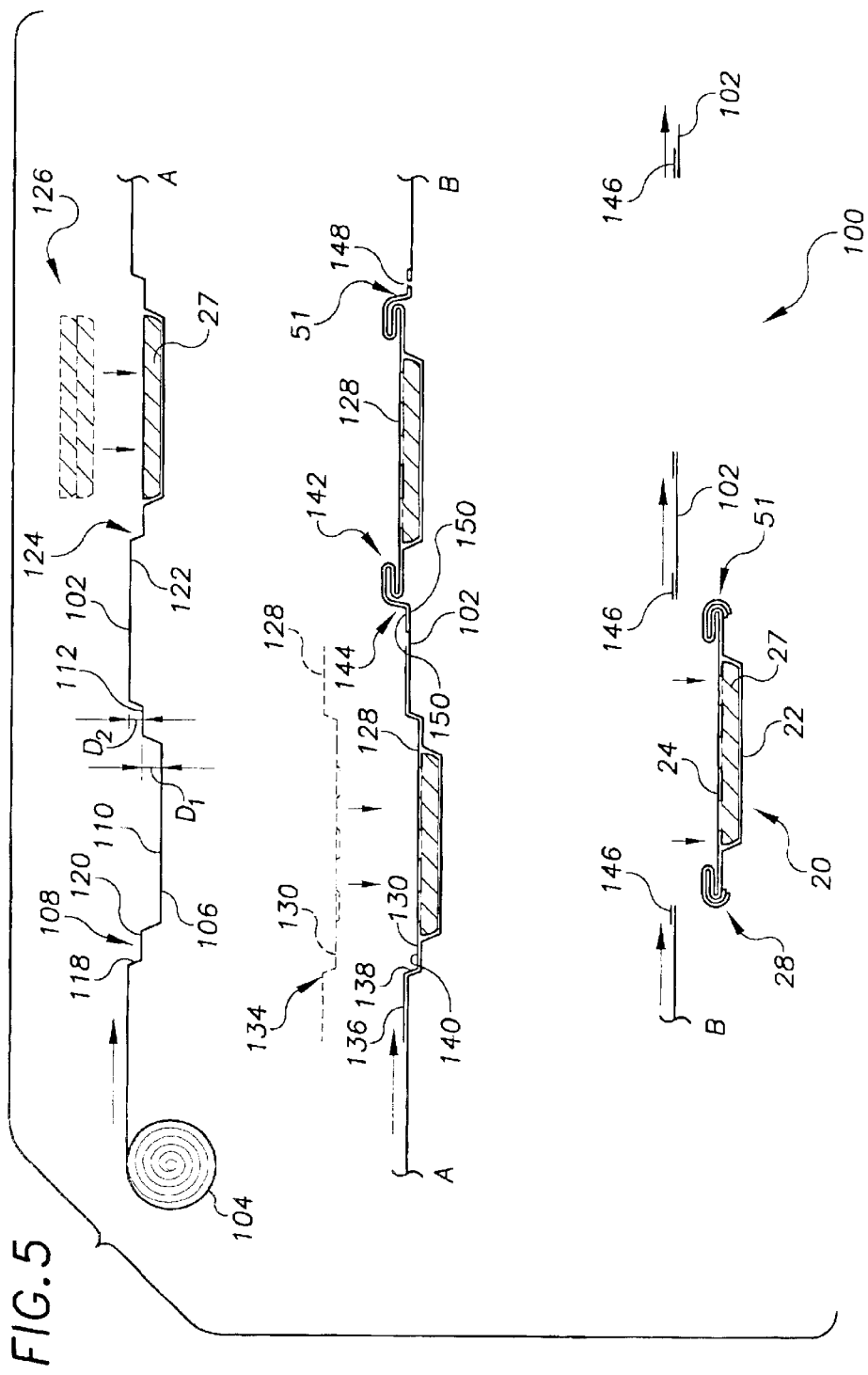
FIG. 5 is a schematic cross-sectional view of the manufacturing process as taken along the line 5—5 of FIG. 4.

Referring now to the drawings, wherein like numerals indicate like elements, FIGS. 4 and 5 show a manufacturing process 100 of the present invention. As described below in detail, manufacturing process 100 may be used make a product, such as thermal shield 20 of FIGS. 1–3 that comprises a first plate 22 and a second plate 24. Manufacturing process 100 utilizes a web 102 from which first plate 22 of thermal shield 20 is made. During manufacturing process 100, second plate 24 is joined to first plate 22 while the first plate remains integral with web 102. Keeping thermal shield 20 integral with web 102 at least until the first and second plates 22, 24 are joined allows the first and second plates to be readily maintained in proper registration with one another until they are joined to one another and/or otherwise processed. It is noted that, although the present invention is shown and described with respect to thermal shield 20, one skilled in the art will appreciate that the present invention may be used to manufacture other thermal shields including without limitation shields having other seam, insulation and design characteristics. Also, process 100 may be used to make products other than thermal shields, such as baking pans and sheets, two-component panels for automotive applications other than thermal shields, e.g., doors, fenders and the like, and for applications in other industries where two-component structures made from at least one initially flat material is desired.

Figure 1:
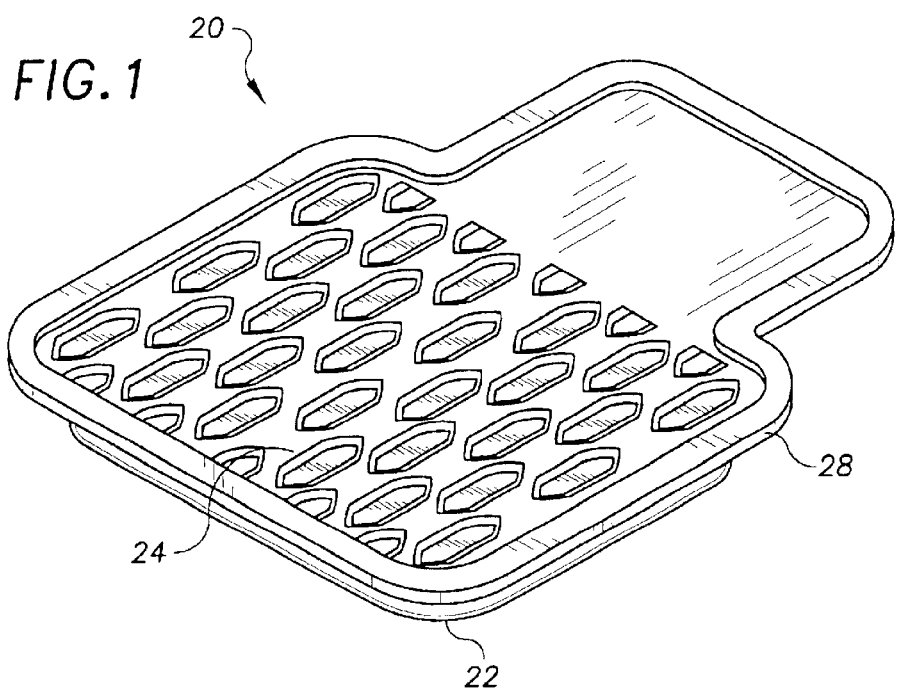
FIG. 1 is a perspective view of a thermal shield made in accordance with the present invention.
Figure 2:
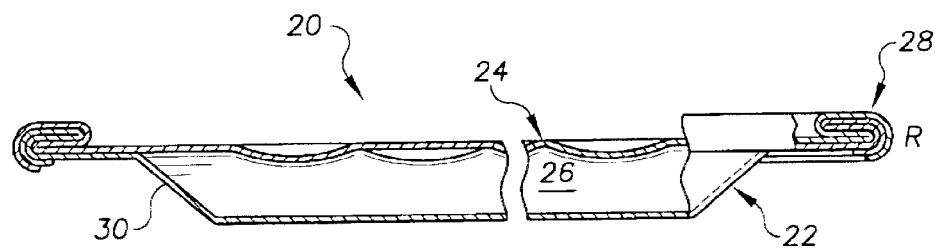
FIG. 2 is a cross-sectional view of the thermal shield as taken along line 2—2 of FIG. 1.

Referring to FIGS. 1–3; thermal shield 20 includes a first plate 22 and a second plate 24, which together define an interior chamber 26. Interior chamber 26 may be filled with air or other gas, but alternatively may contain insulation 27, such as fiberglass, ceramics, aramids or other insulating materials. As illustrated in FIG. 2, interior chamber 26 is provided by forming a recessed section 30 in second plate 24. Alternatively, interior chamber 26 may be provided by forming a similar recessed section (not shown) in first plate 22, or by forming a recess in each of first and second plates 22, 24 that together define interior chamber 26. First plate 22 and second plate 24 may be joined to one another with a seam 28 that extends around the periphery of thermal shield 20. Seam 28 is typically designed to secure together first plate 22 and second plate 24 and provide a seal that impedes the flow of fluid between interior chamber 26 and region R surrounding thermal shield 20. As described below in detail, the method of the present invention provides a high-quality seam regardless of the speed of manufacturing line used to make thermal shield 20 by maintaining first plate 22 and second plate 24 in proper registration with one another from the time the first and second plates contact one another through the step(s) of forming seam 28.

First plate 22 and second plate 24 may be made from a range of materials, but are preferably made from corrosion-resistant materials such as aluminum or stainless steel. The thicknesses of plates 22 and 24 will vary depending upon the intended application, as those skilled in the art will appreciate. However, the thicknesses of first plate 22 and second plate 24 typically range from 76.2 microns (0.003 inch) to 2.3 millimeters (0.09 inch). In addition, the overall configuration of thermal shield 20 will vary as a function of the environment in which it is intended to be used. Thus, the configuration of the thermal shield illustrated in FIGS. 1–3 is only exemplary. Of course, if the product made using the method of the present invention is something other than thermal shield 20, any of a number of other materials, such as plastic, composites and metals other than aluminum and stainless steel, may be used for first and second plates, or components corresponding thereto. Moreover, the thicknesses of the selected material may be any required to suit the particular product made.

Describing the construction of seam 28 in more detail, the seam is made from first peripheral region 31 of first plate 22 and a second peripheral portion 32 of second plate 24. Seam 28 includes a first portion 34 of first peripheral region 31, which first portion extends outwardly relative to interior chamber 26. Seam 28 also includes a second portion 36 of first peripheral portion 30, which second portion is folded at a first fold 37 so as to extend inwardly relative to interior chamber 26. Second portion 36 also preferably extends substantially parallel to and is in contact with first portion 34. First portion 34 and second portion 36 join at shoulder 38 at first fold 37.

In addition, seam 28 includes first portion 40 of second peripheral region 32, which first portion extends outwardly relative to interior chamber 26 and preferably contacts and extends substantially parallel to first portion 34 of first peripheral region 31. Seam 28 also includes second portion 42 of second peripheral region 32. Similar to second portion 36 of first peripheral region 31, second portion 42 is folded at first fold 37 and extends inwardly relative to interior chamber 26, and preferably extends substantially parallel to and contacts second portion 36 of the first peripheral region. First portion 40 and second portion 42 join at shoulder 44 having an outermost (with respect to interior chamber 26) surface 46. Shoulder 44 wraps around shoulder 38 at first fold 37 and is outward of shoulder 38 relative to interior chamber 26.

Seam 28 further includes a third portion 48 of second peripheral region 32, which third portion is folded at a second fold 49 and extends outwardly relative to interior chamber 26. Third portion 48 preferably extends substantially parallel to and contacts second portion 42. Seam 28 also includes fourth portion 50 of second peripheral region 32 that is folded at a third fold 51 and extends at least partially around shoulder 44, outwardly of the shoulder. Fourth portion 50 preferably extends entirely around shoulder 44, as illustrated in FIG. 3, so as to terminate in contact with first portion 40.

An additional component of seam 28 is third portion 52 of first peripheral region 31, which third portion is folded at second fold 49 and extends outwardly relative to interior chamber 26. Third portion 52 preferably extends parallel to and in contact with third portion 48. Third portion 52 is connected to second portion 36 via shoulder 56 at second fold 49, with second portion 42 and third portion 48 being positioned between second portion 36 and third portion 52. Finally, seam 28 includes fourth portion 54 of first peripheral region 31. Fourth portion 54 wraps at least partially around outer surface 46 of shoulder 44 at third fold 51, with fourth portion 50 being positioned between fourth portion 54 and outer surface 46. Preferably, fourth portion 54 wraps entirely around outer surface 46 of shoulder 44, as illustrated in FIG. 3. The type of seam 20 described immediately above may be characterized as a "W-fold" seam due to the cross-sectional shape of first and second peripheral regions 30, 32 containing first, second and third folds 37, 49, 51.

Although seam 28 has been described in detail as being a W-fold seam, seam 28 may be any type of seam suitable for the intended application. For example, seam may be another type of folded seam, such as a two-fold seam, a rolled seam, a welded seam, an adhesively bonded seam or a mechanically fastened seam, such as a pop riveted seam, among others. The structure of seam 28 may be selected based on considerations such as the type of product made, the extent to which the seam must act as a seal, the required strength of the seam, the configurations of the components to be joined by the seam and the means by which the components are held in registration with one another during the formation of the seam, among others.

FIGS. 4 and 5 and also FIG. 6 show and describe manufacturing process 100, which may be used to make thermal shield 20 shown in FIGS. 1–3. As one skilled in the art will appreciate, manufacturing process 100 may be used to make a product other than thermal shield 20. Thus, the preceding description of the method of making seam 28 is not a limitation as to process 100, but rather is provided merely as an example as one potential application for the process. One skilled in the art will understand the various modifications needed to adapt manufacturing process 100 for making such other products. Therefore, these modifications are not described herein.

Manufacturing process 100 includes a number of steps during which thermal shield 20 (FIGS. 1–3) is made while first plate 22 remains integral with a web 102 of material. At step 200, web 102 is supplied to manufacturing process 100. In the embodiment shown, web 102 is supplied from a continuous roll 104 of material. However, in an alternative embodiment, web 102 may be provided as sheets (not shown) of material. One skilled in the art will understand the modifications to manufacturing process 100 necessary to accommodate sheet material rather than rolled material.

Then, at step 202, web 102 is stamped to form a depression 106 within the web. Depression 106 may contain an intermediate step 108 that generally delineates a first depressed region 110 having a depth $D_1$ from a second depressed 112 region having a depth $D_2$. Depression 106 may be formed in a single stamping or in multiple stampings using techniques known in the art. If multiple stampings are used, second depressed region 112 may be formed first. Then, first depressed region 110 may be formed within the periphery of second depressed region 112.

Second depressed region 112 is defined at its outer periphery by a sidewall 118 and at its lower end by a landing 120 of intermediate step 108. Sidewall 118 and at least a portion of landing 120, together with an outer seam region 122 located outwardly adjacent sidewall 118, substantially define a fold region 124 of web 102 from which seam 28 will be created and finished in subsequent steps of manufacturing process 100. For clarity, it is noted that landing 120, sidewall 118 and outer seam region 122 generally correspond, respectively, to first portion 34, second portion 36 and third portion 52 of first peripheral region 31 of first plate 22 shown in FIG. 3.

After depression 106 has been formed, at step 204 insulation 27 may be deposited into first depressed region 110 from a supply 126 via a feeder (not shown). Insulation supply 126 may contain insulation 27 in sheet, roll or other form, and the feeder may be any type of feeder compatible with manufacturing process 100 and the type of insulation used. At step 206, an upper member 128 is engaged with web 102. Upper member 128 includes a depression 130 formed to matingly engage second depressed region 112 of web 102, such that when depression 130 is engaged with second depressed region 112, little or no play exists between the upper member and the web in a direction parallel to the longitudinal axis of the web. It is this mating engagement between depression 130 and second depressed region 112 that holds upper member 128 in proper registration with web 102 during subsequent steps of manufacturing process 100. Thus, depression 130 and second depressed region 112 may be considered both registration means and registration structures.

At step 208, upper member 128 may be supplied from a roll 132 of material or in sheets (not shown) in a manner similar to the supply of web. In step 210 upper member 128 is formed, e.g., stamped to create depression 130 and cut from roll 132 of material, just prior to engagement with web 102. Alternatively, upper member 128 may be preformed at a location remote from manufacturing process 100 and provided to the manufacturing process generally in finished form. Upper member 128 includes a fold region 134 comprising an outer seam region 136, a sidewall 138 and an inner seam region 140, which generally correspond, respectively, to first portion 40, second portion 42 and third portion 48 of second peripheral region 32 of second plate 24 of FIG. 3. When upper member 128 is engaged with web 102, i.e., depression 130 of the upper member engages second depressed region 112 of the web so that the upper member is in proper registration with the web. Accordingly, outer seam region 136 confronts outer seam region 122, sidewall 138 confronts sidewall 118 and inner seam region 140 confronts landing 120.

It is presently contemplated that upper member 128 be provided to manufacturing process 100 in a direction perpendicular to web 102 as illustrated in FIG. 4. However, upper member 128 may be provided to manufacturing process 100 in a direction parallel to web 102. When upper member 128 is provided in a direction parallel to web 102, it may be formed in a continuous web (not shown) similar to web 102. In such an embodiment, the continuous web containing upper members 128 and web 102 could be processed in parallel, but spaced, relation up to step 206, in which each upper member is engaged with the corresponding second depressed region of the web. The two parallel webs could be aligned, but vertically spaced from one another, i.e., be positioned in a stacked configuration, or could extend in side-by-side relation, with or without some relative vertical offset. Alternatively, the continuous web containing upper members 128 could be engaged with web 102 prior to step 206 such that depression 130 of the upper member and second depressed region 112 of the web could be formed simultaneously during a single stamping operation.

At step 212, seam 28 is created by forming a W-fold 142 at fold regions 124, 134, respectively, of upper member 128 and web 102. The process of forming W-fold 142 includes rotating sidewalls 118, 138 about first fold 37 toward landing 120 so that sidewall 138 of upper member 128 confronts inner seam region 140 of the upper member. At the same time, outer seam regions 122, 136 rotate about second fold 49 toward landing 120 such that outer seam region 122 of web 102 confronts sidewall 118 of the web.

Next, at step 214, third fold 51 is partially formed and a fourth fold 144 is formed so that portions of outer seam regions 122, 136 extend substantially vertically downward (as viewed in FIG. 5) from seam 28. In the embodiment shown, the vertical portions of outer seam regions 122, 136 extend a generally small distance below landing 120 of web 102 so that third fold 51 may be completed to finish W-fold 142 of seam 28. Although W-fold 142 is illustrated, one skilled in the art will appreciate that first and second plates 22, 24 (FIGS. 1–3) of thermal shield 20, or corresponding members of another product (not shown), may be joined in a manner other than a W-fold type seam. As mentioned above, seam 28 may be folded into a shape other than a W-shape, spot welded, joined with mechanical fasteners or otherwise joined. It is noted that upper member 128 may be pre-cut to the shape and size of second plate 24 of finished thermal shield 20. In this case, fourth fold 144 will be only in web 102. However, if upper member 128 includes excess material adjacent its outer periphery, fourth fold 144 will be in both the upper member 128 and web 102. Step 214 may be performed substantially simultaneously with step 212, or may be performed entirely separate from step 212.

At step 216, web 102, and upper member 128 if it contains excess material 146, are perforated proximate fourth fold 144 so as to form cut regions 148 and tabs 150 that keep thermal shield 20 attached to web 102. Tabs 150 should be provided in a number and sized to provide sufficient strength to keep thermal shield 20 attached to, and in proper registration with, web 102 during subsequent processing. In addition, as described below, tabs 150 are preferably sized to allow them to be readily severed during the completion of third fold 51 in the next step, step 218. In an alternative embodiment, cut regions 148 may be eliminated and tabs (not shown) created by forming in web 102 and upper member 128 grooves (not shown) having depths less than the corresponding thicknesses of the web and upper member. These grooves would reduce the strength of web 102 and upper member 128, allowing them to be readily severed at the tabs during subsequent forming steps. The grooves may be formed by cutting, stamping or otherwise. In yet another alternative embodiment, tabs 150 may be provided with grooves similar to the grooves just described to further control their ability to tear during subsequent forming steps. Step 216 may be performed substantially simultaneously with step 214, or may be performed entirely separate from step 214.

At step 218, third fold 51 is completed to finish W-fold seam 28, and thermal shield 20 is detached from web 102. Depending upon the materials selected for first and second plates 22, 24 of thermal shield 20, when the number and size of tabs 150 are minimized, the forces created while finishing third fold 51 may be sufficiently large to cause the tabs to tear, i.e., become severed, such that a separate step of cutting the tabs or otherwise separating the thermal shield from web 102 need not be performed. However, if the particular product made by manufacturing process 100 requires a distinct separating step, such step may be performed separately from the operation of completing third fold 51. In addition, processing steps other than finishing third fold 51 may be performed prior to, or substantially simultaneously with, the severing of tabs 150.

While the particular registration structures (means) described herein have certain advantages, e.g., facilitating formation of W-fold 142 of seam 28 and being incorporated into the seam, the registration structures need not be part of the seam nor comprise the particular forms shown. Rather, the registration structures may be formed at any corresponding locations on upper member and web and have any form desired. For example, the registration structures may be formed in one or more regions of web 102 and upper member 128 radially outward of seam 28. Alternatively, depending upon the product made, the registration structures may be incorporated into the design of the product at a location of than seam 28 and, therefore, may formed radially inward of the seam. For example, the registration structures may be incorporated into spacing structures (not shown) within interior chamber 26 of thermal shield 20 that may be provided to stiffen first and second plates 22, 24 or prevent the thermal shield from being readily crushed in a direction perpendicular to the plane of seam 28.

Moreover, the registration means may include virtually any one or more structures on each of web 102 and upper member 128 that nest with, or otherwise inter-engage, one another to limit at least horizontal translation, i.e., movement in a plane parallel to the plane of the web, of the upper member relative to the web. In addition to horizontal translation, the registration means may be designed to limit horizontal rotation of upper member 128 relative to web 102 and also limit vertical movement of the upper member relative to the web, e.g., if the registration means includes a snap-fit feature. Examples of alternative registration means include nestable formations, projections and corresponding receivers, mechanical fasteners, bonding and welding, among others.

Generally, the term "limit" as used herein and in the appended claims means to restrain relative movement between upper member 128 and web 102 to an extent that any movement that may be present after inter-engagement of the registration means does not detrimentally affect the step of joining the upper member to the web. Depending upon the product made using the method of the present invention, acceptable amounts of movement may be on the order of 0.001 inch or less to 0.1 inch or more. In some applications of the present invention, the registration means may be designed to prevent any relative translational and/or relative rotational movement between upper member 128 and web 102.

While the present invention has been described in connection with a preferred embodiment, it will be understood that it is not so limited. On the contrary, it is intended to cover all alternatives, modifications and equivalents as may be included within the spirit and scope of the invention as defined in the appended claims.

What is claimed is:

1. A method of forming a product comprising the steps of:
   providing a web;
   positioning a member proximate said web;
   providing at least one registration structure that limits at least horizontal translation between said member and said web;
   subsequent to providing said at least one registration structure, joining said member to a portion of said web; and
   separating said member and said portion from said web;
   wherein the step of providing said at least one registration structure includes forming a first depression in said portion of said web and a second depression in said member, said first depression and said second depression being nestable with one another; and
   wherein said first depression has a first sidewall and said second depression has a second sidewall and the step of joining said member and said portion of said web with one another includes forming a fold comprising said first and second sidewalls.

2. A method according to claim 1, wherein said fold comprises a W-fold.

3. A method according to claim 1, wherein said portion of said web includes a surface and said fold is continuous and forms a closed shape with respect to said surface.

4. A method of forming a product, comprising the steps of:
   providing a web;
   positioning a member proximate said web;
   providing at least one registration structure that limits at least horizontal translation between said member and said web;
   subsequent to providing said at least one registration structure, joining said member to a portion of said web;
   separating said member and said portion from said web; and
   perforating said web adjacent said portion of said web to facilitate the step of separating said member and said portion of said web from said web.

5. A method according to claim 1, wherein the step of perforating said web is performed substantially simultaneously with the step of joining said member and said portion of said web with one another.

6. A method of forming a product that includes a seam, comprising the steps of:
   providing a web having at least one first registration structure;
   providing a member having at least one second registration structure adapted for inter-engaging said at least one first registration structure to hold said member in substantially fixed horizontal relation to said web;
   engaging said at least one first registration structure and said at least one second registration structure with one another;
   forming the seam from at least a first portion of said at least one first registration structure and from at least a second portion of said at least one second registration structure by folding said web and said member with one another; and
   separating the product from said web.

7. A method of forming a product comprising the steps of:
   providing a web having at least one first registration structure;
   providing a member having at least one second registration structure adapted for inter-engaging said at least one first registration structure to hold said member in substantially fixed horizontal relation to said web;

engaging said at least one first registration structure and said at least one second registration structure with one another;

forming at least a portion of the product from at least a portion of said web and at least a portion of said member;

forming a plurality of tabs extending between the product and said web; and separating the product from said web.

8. A method according to claim 7, wherein the step of separating the product from the web includes severing said plurality of tabs.

9. A method according to claim 8, wherein the product has a seam and said plurality of tabs are separated during forming of the seam.

10. A method of forming a product that includes a cavity, comprising the steps of:

stamping a first registration structure in a web, the step of stamping said first registration structure in said web including forming a depression having a first depressed region for defining at least a portion of the cavity and a second depressed region that defines said first registration structure;

providing a member having a second registration structure nestable with said first registration structure so as to hold said member in substantially fixed translational relation to said web;

nesting said second registration structure with said first registration structure;

joining said web and said member with one another; and separating the product from the web subsequent to the step of joining said web and said member;

wherein said web has first and second longitudinal edges and second depressed region includes a sidewall and a landing each spaced from said first and second longitudinal edges, and the step of joining said web and said member includes folding said sidewall toward said landing.

11. A method of forming a product, comprising the steps of:

stamping a first registration structure in a web;

providing a member having a second registration structure nestable with said first registration structure so as to hold said member in substantially fixed translational relation to said web;

nesting said second registration structure with said first registration structure;

joining said web and said member with one another; and separating the product from the web subsequent to the step of joining said web and said member;

wherein said web includes first and second longitudinal edges, and the step of joining said web and said member includes forming a seam spaced from said first and second longitudinal edges.

12. A method according to claim 11, wherein said web has a surface and said seam is continuous and forms a closed shape with respect to said surface.

13. A method according to claim 11, wherein said seam comprises a W-fold.

14. A method of forming a product, comprising in order the steps of:

providing a web having at least one first registration structure;

providing a member having a second registration structure adapted for engaging said first registration structure to limit horizontal translation of said member relative to said web;

engaging said first registration structure and said second registration structure with one another;

folding a first portion of said member and a second portion of said web with one another so as to join said member to said web; and separating the product from said web subsequent to folding said first and second portions with one another;

wherein said web has first and second long edges and said second portion of said member is spaced from said first and second longitudinal edges.

15. A method of forming a product, comprising in order the steps of:

providing a web having at least one first registration structure;

providing a member having a second registration structure adapted for engaging said first registration structure to limit horizontal translation of said member relative to said web;

engaging said first registration structure and said second registration structure with one another;

folding a first portion of said member and a second portion of said web with one another so as to join said member to said web; and separating the product from said web subsequent to folding said first and second portions with one another, wherein said step of separating includes severing a plurality of tabs connecting the product to said web.

16. A method of forming a plurality of products in a web, comprising the steps of:

providing a web having a longitudinal axis;

providing said web with a plurality of first registration structures spaced from one another along said longitudinal axis;

providing a plurality of members each having a second registration structure adapted for inter-engaging a corresponding one of said first registration structure to substantially prevent horizontal translation of the corresponding one of said plurality of members relative to said web;

engaging each of said second registration structures with a corresponding one of said first registration structures;

joining each of said members with said web so as to at least partially form each of the plurality of products; and separating at least one of the plurality of products from said web while said web contains at least one other of the plurality of products, wherein said step of separating includes severing a plurality of tabs connecting the product to said web.

17. A method of forming a plurality of products, comprising the steps of:

providing a web having a surface and a longitudinal axis;

engaging a plurality of members with said surface of said web such that said plurality of members are spaced from one another along said longitudinal axis;

joining each of said plurality of members to said web so as to at least partially form the plurality of products; and separating, by severing a plurality of tabs connecting the product to said web, each of the at least partially formed plurality of products from said web subsequent to the step of joining said web to each of said plurality of members.

* * * * *